(12) United States Patent
Ueda

(10) Patent No.: US 7,107,680 B2
(45) Date of Patent: Sep. 19, 2006

(54) MANUFACTURING METHOD OF HEAT EXCHANGER AND STRUCTURE THEREOF

(75) Inventor: Naoki Ueda, Kariya (JP)

(73) Assignee: DENSO Corporation, Kariya (JP)

( * ) Notice: Subject to any disclaimer, the term of this patent is extended or adjusted under 35 U.S.C. 154(b) by 6 days.

(21) Appl. No.: 10/869,726

(22) Filed: Jun. 16, 2004

(65) Prior Publication Data
US 2005/0034848 A1 Feb. 17, 2005

(30) Foreign Application Priority Data
Jun. 20, 2003 (JP) ............................. 2003-176822

(51) Int. Cl.
*B23P 15/26* (2006.01)
*F28F 3/12* (2006.01)
*B23K 31/02* (2006.01)

(52) U.S. Cl. ............................. 29/890.053; 29/890.054; 165/79; 165/170; 165/177; 228/183

(58) Field of Classification Search ................ 165/170, 165/79, 177; 29/890.053, 890.054
See application file for complete search history.

(56) References Cited

U.S. PATENT DOCUMENTS

| 3,833,986 | A | * | 9/1974 | DeCicco ................ 29/890.047 |
| 3,957,289 | A | * | 5/1976 | Kilgore et al. ................ 285/22 |
| 3,981,354 | A | * | 9/1976 | Haberski ...................... 165/79 |
| 4,077,559 | A | * | 3/1978 | Watson, Jr. .................. 228/154 |
| 4,501,321 | A | * | 2/1985 | Real et al. ................... 165/170 |
| 5,062,476 | A | * | 11/1991 | Ryan et al. .................... 165/79 |
| 5,490,559 | A | * | 2/1996 | Dinulescu ................... 165/148 |
| 5,697,433 | A | * | 12/1997 | Kato ........................... 165/170 |
| 2003/0010480 | A1 | | 1/2003 | Shibagaki et al. |

FOREIGN PATENT DOCUMENTS

| JP | 61-20431 U | 2/1986 |
| JP | 2001-129661 | 5/2001 |

* cited by examiner

*Primary Examiner*—Leonard R. Leo
(74) *Attorney, Agent, or Firm*—Harness, Dickey & Pierce, PLC

(57) ABSTRACT

A first plate and a second plate have brazing paste on the surface thereof. When the first plate is combined with the second plate while an inner fin is disposed therein, a protrusion forms a clearance there between. Heat is added to evaporate the organic substances in the brazing paste. The organic substances vapor is discharged into outside of the tube through the clearance. After that, heat is added furthermore to melt the brazing paste. The first plate and the second plate are brazed together to form the tube and the inner fin is brazed to the inside of the tube.

14 Claims, 4 Drawing Sheets

MANUFACTURING METHOD OF HEAT EXCHANGER AND STRUCTURE THEREOF

CROSS-REFERENCE TO RELATED APPLICATION

This application is based on Japanese Patent Application No. 2003-176822 filed on Jun. 20, 2003, the disclosure of which is incorporated herein by reference.

FIELD OF THE INVENTION

The present invention relate to manufacturing method of heat exchanger and structure thereof, which has a tube formed by combing a plurality of plates, and which has a corrugated fin brazed in the tube.

BACKGROUND OF THE INVENTION

JP-2003-28586 A shows manufacturing method of a heat exchanger, which has a tube in which an inner fin is provided.

In this conventional method, a first plate and a second plate, which have a substantially U-shaped cross section, are combined with each other while holding an inner fin therein. After that, the inner fin and the first and second plate are bonded by brazing paste so that the tube having the inner fin therein is formed.

The brazing paste is applied on surfaces of the first plate and the second plate. Thereby, the inner fin is easily disposed inside of the tube.

However, in the above conventional manufacturing method of the heat exchanger, it is likely that a defective brazing may occur at the brazing portion of the inner fin. The inventor of the present invention realizes that such a defective brazing occurs for following reasons.

The brazing paste, generally, contains organic substances to make the brazing material in the form of a paste. When the first plate, the second plate, and the inner fin are heated to bond them together, the organic substances in the brazing paste on the first plate and the second plate evaporate before the brazing material melts.

The evaporating organic substances tend to remain the inside of the tube and hardly flow out from the tube since the first plate and the second plate are bonded. A part of the evaporating organic substances may form a layer on the inner surfaces of the first and second plate and the outer surface of the inner fin. This kind of layer deteriorates the wettability of the brazing material so that the defective brazing may be occurred at the brazing portion.

SUMMARY OF THE INVENTION

An object of the present invention is provide a manufacturing method of a heat exchanger and structure thereof, which can restrict the occurrence of the defective brazing.

In the present invention, the manufacturing method comprises an arranging step for combining a first plate with a second plate while an inner fin is disposed there between, the first plate and the second plate having a substantially U-shaped cross section, an evaporating step in which the combined plates and the inner fin are heated so that the organic substances evaporate, and a bonding step for bonding the first plate and the second plate together with the inner fin after the brazing material melts. In the arranging step, a clearance is formed between the first plate and the second plate. In the evaporating step, the evaporating organic substances flow out from the inside of the tube through the clearance.

According to the above present invention, the organic substances evaporating during the evaporating step hardly makes the layer on the surface of the first plate, the second plate and the inner fin. Therefore, in the boding step, the defective brazing is restricted.

According to the present invention, the heat exchanger comprises a tube formed by combining a first plate with a second plate which have substantially U-shaped cross sections in such a manner that an opening edge of both plates confront each other, and the heat exchanger comprises a clearance forming member which forms the clearance between the first plate and the second plate until the first plate and the second plate are bonded together. Since the evaporating organic substances do not make the layer on the outer surface of the first and second plate and the inner fin, the defective brazing is restricted.

DETAILED DESCRIPTION OF EMBODIMENT

Embodiment of the present invention will be described hereinafter with reference to the drawings.

Figure 1:
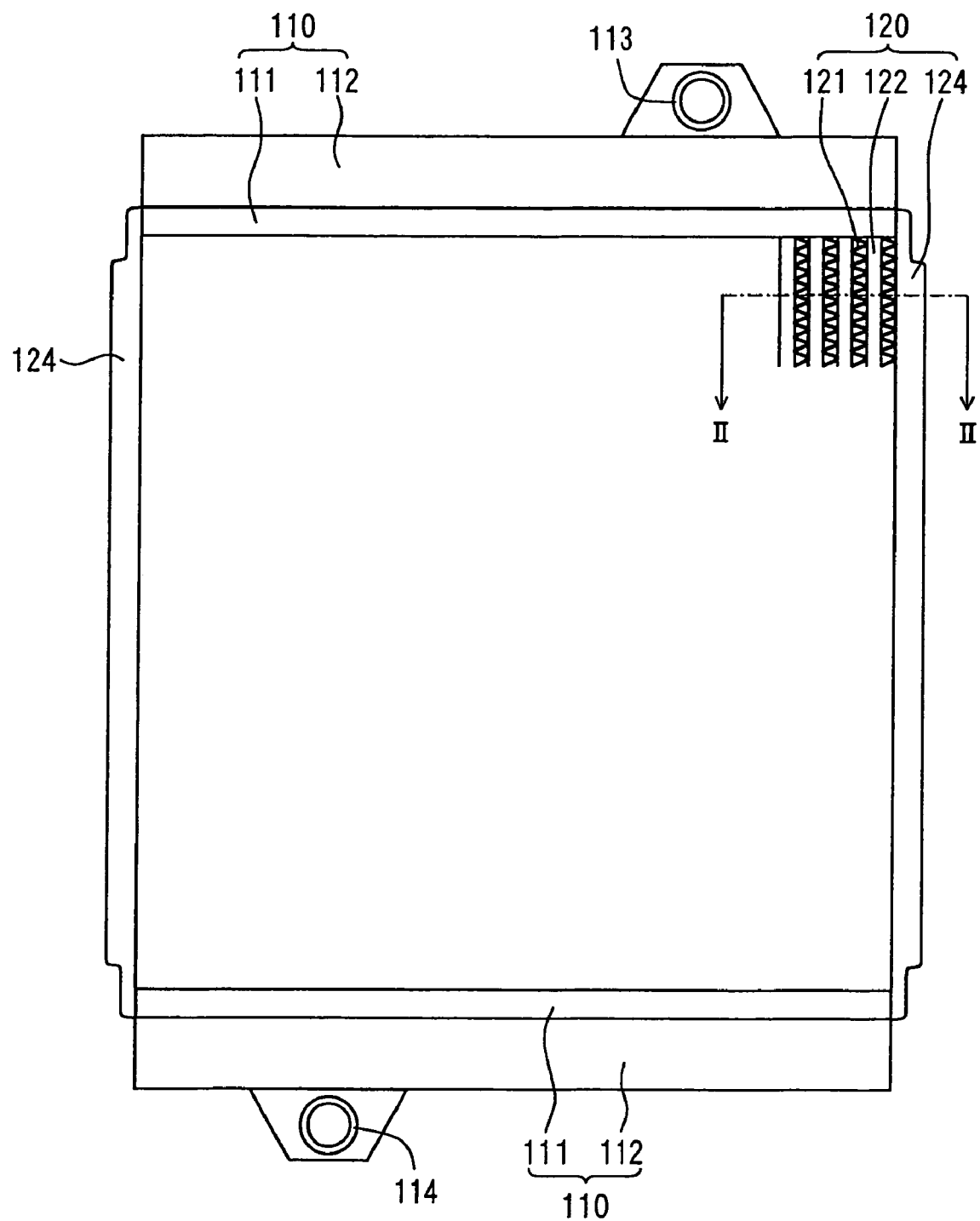
FIG. 1 is a schematic front view of the intercooler according to the embodiment of the present invention.
Figure 2:
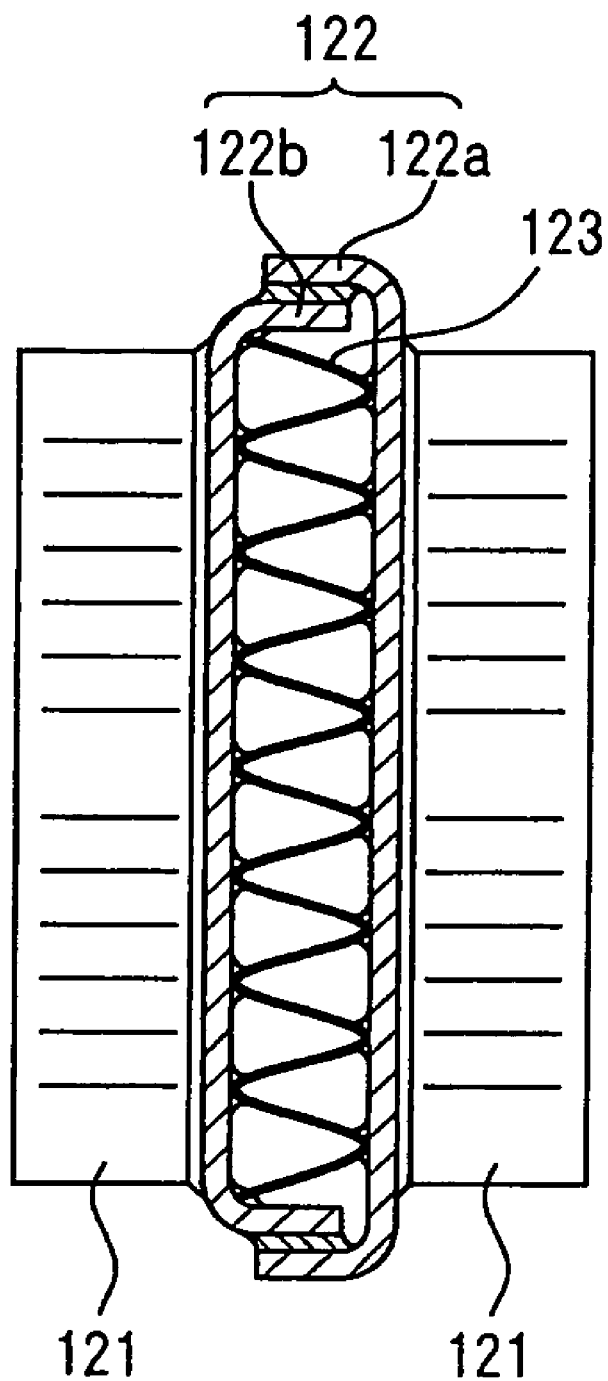
FIG. 2 is a cross sectional view along the line II—II in FIG. 1.

In this embodiment, the present invention is applied to an intercooler which cools the air pressurized by the supercharger before being introduced into an engine. FIG. 1 shows a schematic front view showing the intercooler. FIG. 2 is a cross sectional view along the line II—II in FIG. 1. In FIG. 1, a part of core portion 120 is indicated. In FIG. 2, a part of the cross section of core portion 120 is indicated.

As shown in FIG. 1, the inter cooler 100 has the core portion 120 and a pair of header tanks 110 disposed at upper and lower ends thereof. Each of the header tanks 110 has a core plate 111 and tank portion 112, which are made of copper. The core plate 111 and the tank portion 112 are brazed to each other to form an inner space therein.

The upper header tank 110 is provided with an inlet joint 113 which communicates with the inner space of the header tank 110. The lower header tank 110 is provided with an outlet joint 114 which communicates with the inner space of the header tank 110. The inlet joint 113 is connected with an outlet of the super charger (not shown) and the outlet joint 114 is connected with an intake port of the engine.

Multiple outer fins 121 and multiple tubes 122 are alternately arranged to form the core portion 120. A side plate 124 as a reinforcement is brazed to the outermost fin 121 by brazing.

The header tank 110 is disposed at upper and lower ends of the core portion 120 in such a manner that the header tank 110 communicates with the tubes 122. The header tank 110 extends in an orthogonal direction with respect to the longitudinal direction of the tubes 122. Both ends of the tubes 122 are inserted to connecting holes which are not shown, and are brazed to the core plate 111.

As shown in FIG. 2, a flat tube 122 is comprised of a first plate 122a and the second plate 122b, which have substantially U-shaped cross-section. The first plate 122a and the second plate 122b confront at the periphery thereof and are brazed to each other. The inner fin 123 is brazed to the inner surface of the tube 122 and the outer fin 121 is brazed to the outer surface of the tube 122. The first plate 122a corresponds to a first plate member and the second plate 122b corresponds to a second plate member in this embodiment.

The outer fin 121 and inner fin 123 are made of copper which has high heat conductivity. The first plate 122a, the second plate 122b, and the side plate 124 are made of copper alloy which has a high strength and high heat conductivity. The copper alloy which forms the first and second plates 122a, 122b contains 5 wt % or more of zinc.

All element members comprising the core portion 120 and the core plate 111 are temporarily assembled with a jig and the like, and then are brazed to each other by brazing paste. After that, the tank portion 112 is fixed on the core plate 111 to form the inter cooler 100.

The inter cooler 100 of this embodiment has the tube 122 which has a longitudinal length of about 800 mm (a vertical length in FIG. 1), a length orthogonal to the longitudinal length of about 60 mm (a vertical length in FIG. 2), and a width of about 6 mm (a horizontal length in FIG. 2).

Figure 3A:
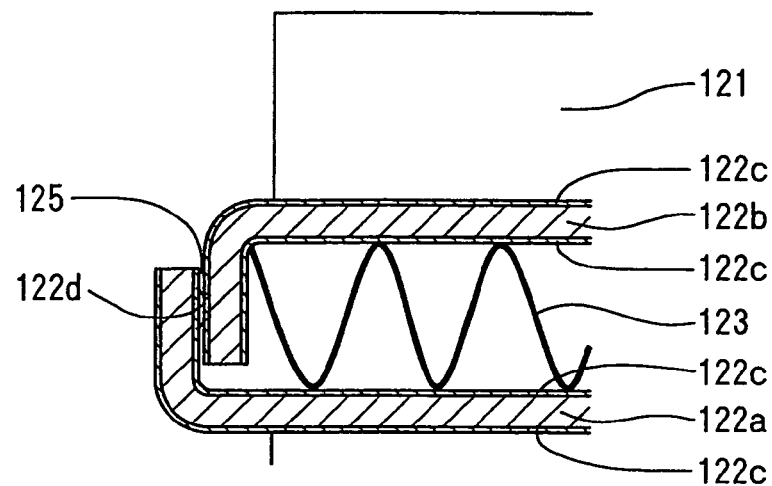
FIGS. 3A, 3B, and 3C are cross sectional view of the essential part of the inter cooler in individual manufacturing step.
Figure 3B:
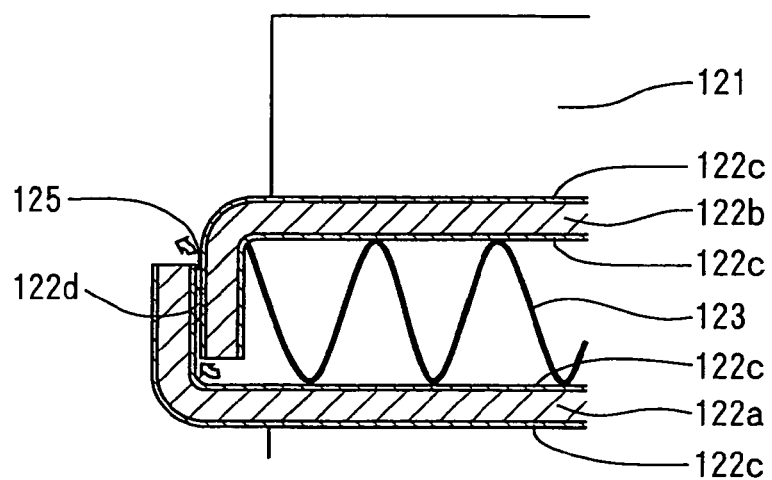
Figure 3C:
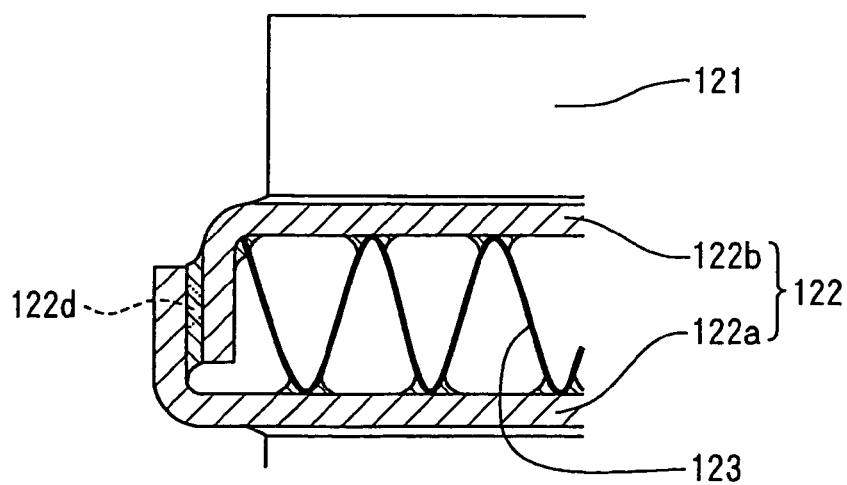

The present invention is characterized by the structure and the manufacturing method of the tube 122, which is comprised of the first plate 122a, the second plate 122b, and the inner fin 123. Referring to FIGS. 3A, 3B, and 3C, the details thereof are described herein after. FIGS. 3A, 3B, and 3C are cross sectional views of the essential part in individual manufacturing step.

As shown in FIG. 3A, the first plate 122a and the second plate 122b, which have substantially U-shaped cross section, are engaged with each other in such a manner that the opening peripheries are confronted while holding the inner fin 123 therein. The first plate 122a and the second plate 122b have a paste layer (brazing paste layer) 122c on both sides which has a thickness of about 60 µm to 80 µm.

The brazing paste in this embodiment contains 89 wt % of Sn—P—Cu alloy as the brazing component, 10 wt % of aliphatic hydrocarbon and alicyclic hydrocarbon which are the organic substances and are used as binder and solvent, and 1 wt % of polyisobutylene.

The tube 122 in this embodiment, as described above, is the flat tube which has relatively long length in a longitudinal direction in cross section. Since the inner fin 123 is sandwiched between the first plate 122a and the second plate 122b to be disposed in the tube 122, it is more advantageous that the paste layer 122c is prevented from being destroyed than the case in which the inner fin is inserted into the tube from an opening end.

The paste layer 122c is provided between the first and the second plate 122a, 122b and the inner fin 123, and the first and the second plate 122a, 122b and the outer fin 121. Therefore, by adjusting the thickness of the paste layer 122c, the width of the core portion 120 (a lateral width in FIG. 1) and the thickness of the tube 122, which comprised of the first plate 122a and the second plate 122b, can be adjusted. Thus, when the core portion 120 and the core plate 111 are assembled, the ends of the tube 122 can be easily inserted into the connecting holes of the core plate 111.

When the width of the core portion 120 is larger than the width in assembling to the core plate 111 and the pitch of the tube 122 is lager than that of the connecting holes, the pitch of the tube 122 can be adjusted by pressing the core portion 120 to deform the outer fin 121 and the inner fin 123. In this embodiment, the flat tubes are not deformed when the core portion 120 is pressured in its width direction, because the outer fin 121 is deformed.

Figure 4A:
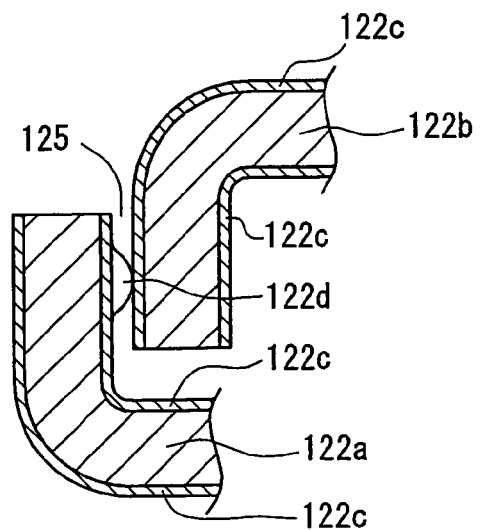
FIGS. 4A, 4B and 4C are enlarged views illustrating the protrusion on the inner surface of the plate.

As shown in FIG. 4A, a protrusion 122d is provided on the inner surface of the sidewall of the first plate 122a which has a substantially U-shaped cross-section. Multiple protrusions 122d are provided on the both inner surfaces of the sidewalls of the first plate 122a in a predetermined pitch. The top ends of the protrusions 122d contact the outer surface of the sidewall of the second plate 122b. A clearance 125 is formed between the inner surface of the first plate 122a and the outer surface of the second plate 122b on which the paste layer 122c is provided.

After the assembling of the first plate 122a and the second plate 122b, the assembly is heated in a furnace. In the furnace, a gas including reduction gas such as hydrogen gas or inactive gas such as nitrogen gas circulates and the hydrogen gas flows through the assembly. When the temperature of the assembly rises up to about 300° C. to 350° C., the organic substances in the paste layer 122c evaporate.

Figure 4B:
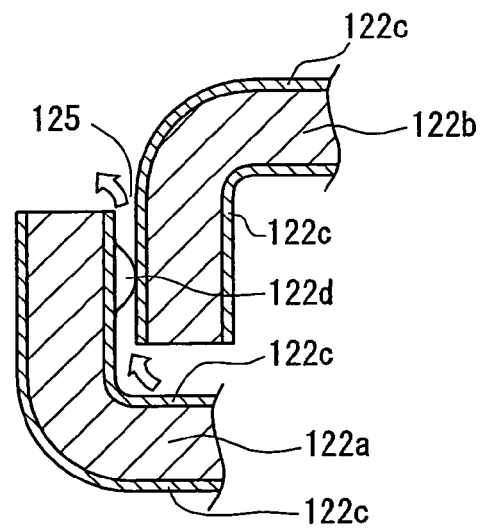

The evaporated organic substances are discharged through the clearance 125 as shown by an arrow in FIG. 4B.

A part of zinc contained in the first plate 122a and 122b is spread and is discharged through the clearance 125.

The organic substances and the spread zinc are discharged into the outside of the assembly by introducing the gas in the furnace from one end opening to the other end opening of the assembly.

After that, the assembly is heated up to about 680° C. The paste layer 122c from which the organic substances evaporated melts at about 600° C. or more.

Figure 4C:
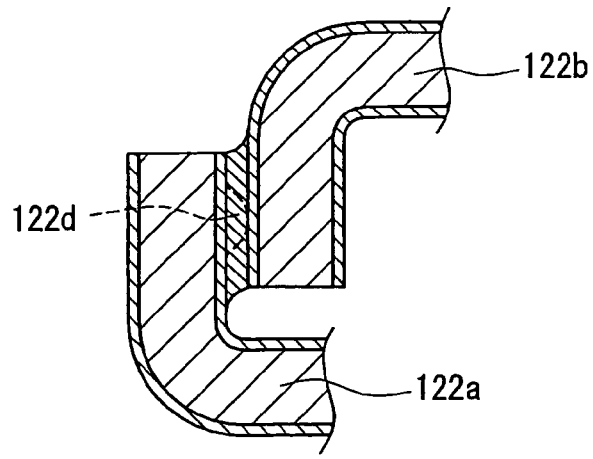

As shown in FIG. 4C, the melting brazing material flows into the contacting points of each element to bond the first plate 122a and the second plate 122b together so that the tube 122 is formed. The inner fin 123 is bonded on the inner surface of the tube 122 and the outer fin 121 is bonded on the outer surface of the tube 122.

FIGS. 3A and 4A show the arranging step, FIG. 3B and 4B show the evaporating step, and FIG. 3C and 4C show the bonding step.

It is preferable that the clearance 125 is 0.05 mm to 0.2 mm. The clearance 125 is an interstice between the paste layer 122c on the inner surface of the first plate 122a and the paste layer 122c on the outer surface of the second plate 122b. When the clearance is lass than 0.05 mm, the organic substances evaporated in the evaporating step are hardly discharged into the outside.

On the other hand, when the clearance is over 0.2 mm, the first plate 122a and the second plate 122b are hardly bonded with reliability.

According to the manufacturing method described above, the clearance 125 is formed between the first plate 122a and the second plate 122b in the arranging step, and the evaporated organic substances and the spread zinc from the plates 122a, 122b are discharged through the clearance 125 before the brazing material melts in the evaporating step. Therefore, the layer of the organic substances and/or the oxide layer of zinc substances is hardly formed on the inner surface of the first and second plates 122a, 122b and the outer surface of the inner fin 123 before brazing. Thus, the defective brazing is restricted in the bonding step.

The flat tube 122 of this embodiment has long length in the longitudinal direction in cross section relative to the width and the vertical length thereof. In such a flat tube 122, it is relatively hard to discharge the organic substances vapor in a longitudinal direction. Thus, it is advantageous that the organic substances vapor is discharged into the outside of the tube through the clearance 125.

When the melting brazing material spreads in the bonding step, the clearance arises between the plates 122a, 122b and the inner fin 123, and the plates 122a, 122b and the outer fin 121, which are contacted with each other through the paste layer 122c.

In the arranging step, since the core portion 120 is pressed in the width direction, the inner fin 123 and the outer fin 121 are deformed. In the bonding step, the both fins 121, 123 resile according to the melting of the brazing material. Thus, the plates 122a, 122b and the inner fin 123, and the plates 122a, 122b and the outer fin 121 keep in touch with each other, and brazing is carried out with reliability.

In the arranging step, even if the inner fin 123 is not deformed, the first plate 122a and the second plate 122b moves toward the inner fin 123 by the resilience of the outer fin 121 and the pressing forth of the jig so that the fin 123 is brazed with reliability.

(Another Embodiment)

In the preceding embodiment, the protrusion 122d is integrally provided on the first plate 122a to form the clearance 125. The protrusion 122d can be provided on the second plate 122b. The protrusion 122d can be provided on the first plate 122a and the second plate 122b. Alternatively, an independent spacer can be disposed to form the clearance.

In the preceding embodiment, the first plate 122a and the second plate 122b are made of copper alloy containing zinc. The components of the plates 122a, 122b are not limited to the copper alloy. According to the present invention, the organic substances in the paste material can be discharged into the outside of the tube before brazing material melts if the plates and the inner fin are bonded by brazing paste even if the plates and the inner fin are made of other metallic material.

In the preceding embodiment, the present invention is applied to the inter cooler 100 as the heat exchanger. The present invention can be applied to the other heat exchanger such as an oil-cooler.

What is claimed is:

1. A manufacturing method of a heat exchanger comprising:
    an arranging step for combining a first plate with a second plate in such a manner that opening peripheries are confronting each other while an inner fin is disposed there between, the first plate and the second plate having a substantially U-shaped cross section, the first plate and the second plate being provided with a brazing material layer thereon;
    an evaporating step in which the combined plates and the inner fin are heated so that the organic substances in the brazing material layer evaporate, and
    a bonding step for bonding the first plate and the second plate together with the inner fin after the brazing material melts, wherein
    a clearance is formed between the first plate and the second plate in the arranging step, and
    an organic substances vapor is discharged from an inside of the first plate and the second plate through the clearance in the evaporating step.

2. The manufacturing method of an heat exchanger according to claim 1, wherein
    the first plate and the second plate are arranged in such a manner that the clearance has 0.05 mm to 0.2 mm of width in the arranging step.

3. The manufacturing method of an heat exchanger according to claim 1, wherein
    a spacer is disposed to form the clearance in the arranging step.

4. The manufacturing method of an heat exchanger according to claim 3, wherein
    the spacer is integrally provided on at least one of the first plate and the second plate.

5. The manufacturing method of an heat exchanger according to claim 1, wherein
    the first plate and the second plate are made of copper alloy containing zinc.

6. The manufacturing method of an heat exchanger according to claim 5, wherein
    the copper alloy contains 5 wt % or more of zinc.

7. The manufacturing method of heat exchanger according to claim 1, wherein
    an assembly of the first plate and the second plate is heated in gas including reduction gas or inactive gas in the evaporating step.

8. The manufacturing method of heat exchanger according to claim 7, wherein
    the gas including the reduction gas or the inactive gas flows between the first plate and the second plate in the evaporating step.

9. The manufacturing method of the heat exchanger according to claim 1, wherein
    the organic substances include a hydrocarbon.

10. A heat exchanger comprising:
    a tube configured by combining a first plate with a second plate in such a manner that an outer periphery confronts to each other, the first plate and the second plate having substantially U-shaped cross section; and
    an inner fin bonded in the tube by brazing paste, wherein
    the tube has a spacer to form a clearance between the first plate and the second plate, the clearance existing until the first plate and the second plate are bonded.

11. The heat exchanger according to claim 10, wherein
    the spacer is integrally provided on at least one of the first plate and the second plate.

12. The heat exchanger according to claim 10, wherein
    the first plate and the second plate are made of copper alloy containing zinc.

13. The heat exchanger according to claim 12, wherein the copper alloy contains 5 wt % or more of zinc.

14. The heat exchanger according to claim 10, wherein the clearance has 0.05 mm to 0.2 mm of width.

* * * * *